Patented June 5, 1934

1,961,630

UNITED STATES PATENT OFFICE 1,961,630

PREPARATION OF HYDROXY-KETONES

Edgar C. Britton, Midland, Mich., assignor to The Dow Chemical Company, Midland, Mich., a corporation of Michigan No Drawing. Application March 16, 1931, Serial No. 523,197

12 Claims. (Cl. 260—64)

The present invention is concerned with a method for the preparation of hydroxy-ketones by hydrolyzing the corresponding halo-ketone with an aqueous hydrolytic agent at a relatively high temperature and pressure, particularly by hydrolyzing the corresponding chloro-ketone.

Heretofore, 4-hydroxy-acetophenone, as representing such hydroxy-ketones, has been prepared by reacting phenol with acetyl chloride to form phenylacetate, followed by rearrangement of the latter by suitable treatment thereof to form a mixture of 2- and 4-hydroxy-acetophenones, such mixture then being separated into the components thereof, the desired 4-compound usually being obtained in approximately a 30 per cent yield. The corresponding 4-hydroxy-benzophenone has usually been prepared from phenyl benzoate in poor yield in the same manner.

It is known when acetophenone is warmed to 55°-60° C. for several days with powdered sodium hydroxide that a condensation product, i. e. dypnopinakolin, is formed; when the temperature is maintained at 110° to 120° C., there is formed a high-boiling hydrocarbon, benzoic acid, and water; and when acetophenone is allowed to stand several days with dry sodium ethylate, another condensation product, dypnone, is formed (Delacre, Ann. Chim. (9) 2-63: 1914). It also is known when halogenated benzophenones are treated with alcoholic potassium hydroxide, that all or part of the halogen is replaced by hydrogen (Montagne, R. 39-350: 1920) and that the ketone group is reduced to an alcoholic group: 4-bromo-benzophenone being converted similarly into a mixture of 4-bromo-benzhydrol and benzhydrol. Accordingly, the product obtained varies with the base and the conditions employed.

In contrast to the above, I now have found when certain halogenated ketones, e. g. 4-chloro-acetophenone, are heated under suitable conditions to a relatively high temperature and pressure with an aqueous hydrolytic base, that unexpectedly hydrolysis of the halo compound occurs, the halogen being replaced by a hydroxy group to form the corresponding hydroxy-ketone, e. g. 4-hydroxy-acetophenone, and that condensation products of the abovementioned type are not formed in substantial amount.

My invention, then, consists of the method and products hereinafter fully described and particularly pointed out in the claims, the following description setting forth in detail certain preferred procedure for carrying out the principle of my invention.

The preparation of 4-hydroxy-acetophenone will be generally described as representing my new method. 4-chloro-acetophenone may first be prepared by reacting acetyl chloride with chlorobenzene in the presence of a condensing agent, such as substantially anhydrous $AlCl_3$, an excess of said chlorobenzene being employed as solvent. Then, the 4-chloro-acetophenone, after separation from the above obtained reaction mixture, is heated with an excess of aqueous hydrolytic agent, such as an alkali metal hydroxide, carbonate, borate, or mixture thereof, to the desired temperature for a sufficient length of time to hydrolyze said chloro compound, such hydrolytic agent being employed preferably in a concentration of 5 to 25 per cent and in a ratio of approximately 2 to 5 moles thereof to 1 mole of chloro compound. The hydrolysis is carried out in any suitable apparatus such as an autoclave which is capable of withstanding the pressure exerted by the reactants at the temperature employed, in general from about 150° to 400° C., and which may be constructed of iron, copper, or equivalent thereof, or may be internally-lined with copper. However, the temperature at which the herein described hydrolytic reaction may be carried out, will vary with the hydrolytic agent employed, the concentration of the reactants, and the particular halo compound employed, the bromo-ketones being capable of being hydrolyzed at a relatively lower temperature than the corresponding chloro-ketones.

The resulting reaction mixture may then be worked up in any suitable way to obtain the desired product therefrom. For instance, the cooled reaction mixture may be steamed out or extracted with a water-immiscible solvent, such as chlorobenzene, to separate unreacted halo-ketone or other alkali-insoluble material therefrom, then acidified to precipitate the hydroxy-ketone, and the latter separated from residual aqueous liquors.

In carrying out the above method, particularly at high temperatures, the use of a copper-containing catalyst such as metallic copper, a copper oxide, e. g. cuprous oxide, or equivalent thereof, is beneficial and may be necessary to obtain high yields of the desired product. For instance, when hydrolyzing chloro-acetophenone in an iron bomb at any temperature without a copper catalyst, a high percentage of the chloro compound was reacted, the product being, however, a viscous material and not the desired hydroxy-ketone, whereas when the reaction was carried out in a copper bomb under otherwise like conditions, again a high percentage of the chloro compound was reacted, but the reacted material was chiefly the desired hydroxy compound.

The following examples illustrate several ways of carrying out my present invention:—

*Example 1*

A mixture of 109.5 grams of 4-chloro-acetophenone and 775 grams of 10 per cent aqueous sodium hydroxide was heated in a rotating internally copper lined reactor at a temperature of about 190° C. for 5 hours, obtaining thereby an 83 per cent conversion of chloro compound into hydroxy compound. The alkaline reaction product was steamed out to remove unreacted 4-chloro-acetophenone, acidified, and then extracted with ethylene dichloride. The non-aqueous extract containing 4-hydroxy-acetophenone was fractionally distilled, the latter being thereby obtained in a 96 per cent yield, based on the reacted material.

*Example 2*

A mixture, containing the same reactants and in the same ratio as in the above example, was heated in a rotating copper reactor at 230° C. for 3 hours. The reaction mixture was steamed out to separate unreacted chloro compound therefrom, and hydrochloric acid added to the former until the sodium hydroxide therein remained only in 20 per cent excess of the amount required to form the sodium salt of 4-hydroxy-acetophenone. Benzoyl chloride, in 10 per cent excess over the amount required to form the benzoyl derivative of the 4-hydroxy-acetophenone therein, then was added to such aqueous alkaline liquor with shaking in the presence of ice, the said benzoyl derivative being thereby obtained in almost a quantitative yield, based on the starting material.

*Example 3*

In like manner, 36 grams of 4-chloro-acetophenone was reacted with 200 grams of 10 per cent aqueous sodium hydroxide (containing a small amount of copper dissolved therein) in an iron reactor at 320° to 330° C. for 50 minutes, thereby obtaining an 85 per cent yield of 4-hydroxy-acetophenone.

*Example 4*

A run similar to that described in Example 3, excepting that the alkali was free from dissolved copper compounds, that 2 grams of cuprous oxide was added to reactants, and that the reaction was carried out at 230° C. for 3 hours in an iron bomb, gave a 95 per cent yield of 4-hydroxy-acetophenone. (In a corresponding run in the absence of copper, 95 per cent of the chloro compound reacted, but the product obtained was chiefly tar. (In a corresponding run in the absence of copper, and using sodium hydroxide dissolved in 90 per cent methyl alcohol, only 78 per cent of the chloro compound reacted, the product again being chiefly tar).

*Example 5*

As in Example 2, 51 grams of 4-chloro-acetophenone was reacted with 78 grams of sodium carbonate in 690 grams of water, for 5 hours at 200° C. in a copper reactor. The chloro compound was thereby 35 per cent converted into a product wherefrom 4-hydroxy-acetophenone was isolated in a 96 per cent yield.

*Example 6*

Similarly, 14 grams of 4-chloro-butyrophenone was heated with 200 grams of aqueous 10 per cent sodium hydroxide (containing a small amount of copper oxide dissolved therein) in an iron reactor at 250° C. for 3 hours. The yield of crude 4-hydroxy-butyrophenone (M. P. 79°–80° C.) was 91 per cent based on a 96.5 per cent conversion. After recrystallization from dilute acetic acid, the product melted at 91.5° C.

*Example 7*

36.8 grams of 4-chloro-benzophenone, when reacted in like manner with 185 grams of 10 per cent sodium hydroxide (containing a small amount of copper oxide dissolved therein) at 220° C. for 3 hours in an iron reactor was 95.5 per cent converted into a product from which pure 4-hydroxy-benzophenone was isolated in 92 per cent yield. (A similar run at 210° C. in the absence of copper resulted in only a 25 per cent conversion, the yield of 4-hydroxy-benzophenone being 95 per cent).

*Example 8*

28.5 grams of 4.4'-dichloro-benzophenone, when similarly hydrolyzed by heating the same with 246 grams of 10 per cent sodium hydroxide (containing a small amount of copper oxide dissolved therein) at 250° C. for 3 hours, in a copper reactor was almost quantitatively reacted, 4.4'-dihydroxy-benzophenone (crude=M. P. 209° C.) being obtained from the product in 95 per cent yield, (recrystallized from dilute alcohol=M. P. 214° C.).

*Example 9*

As in the above examples, 54 grams of 3-phenyl-4-chloro-benzophenone was heated with 205 grams of 10 per cent aqueous sodium hydroxide in a copper bomb at 300° C., the conversion being about 80 per cent. The 3-phenyl-4-hydroxy-benzophenone was obtained in 67 per cent yield based on the reacted material. Recrystallized from benzene, the product melted at 135° C.

*Example 10*

Similarly, 40.3 grams of 1.4-acetyl-chloro-naphthalene was reacted with 214 grams of 10 per cent aqueous sodium hydroxide solution at 230° C. for 3 hours, the conversion being 77 per cent and the yield of purified 1.4-hydroxy-acetyl-naphthalene (M. P.=200° C. after recrystallization from 1.2-dichlorobenzene), 30 per cent.

In brief, my invention involves the hydrolysis of a halo-ketone of the general formula, R'—CO—R—X, wherein X represents a halogen, R an aryl group, and R' an alkyl or aryl group, (R' may further be substituted by halogen when representing an aryl group), by reacting such halo-ketone with a suitable aqueous hydrolytic agent at a relatively high temperature and pressure, preferably in the presence of a copper-containing catalyst, to form the corresponding hydroxy-ketone.

Other modes of applying the principle of my invention may be employed instead of those explained, change being made as regards the details herein disclosed, provided the step or steps stated by any of the following claims or the equivalent thereof be employed.

I therefore particularly point out and distinctly claim as my invention:—

1. The method of making a hydroxy-ketone which comprises hydrolyzing a halo-ketone having the general formula, R'—CO—R—X, wherein R represents an aryl group, X a halogen, and R' represents a member of the class consisting of alkyl, aryl, and holaryl groups, by heating, at superatmospheric pressure, a mixture of such halo-ketone and an aqueous hydrolytic agent in the presence of a copper-containing catalyst to a temperature sufficient to cause reaction between said halo-ketone and the hydrolyzing agent.

2. The method of making a hydroxy-ketone which comprises hydrolyzing a halo-ketone having the general formula, R'—CO—R—X, wherein R represents an aryl group, X a halogen, R' represents a member of the class consisting of alkyl, aryl and haloaryl groups, by reacting such halo-ketone, in the presence of a copper-containing catalyst, with an aqueous hydrolytic agent selected from the group consisting of alkali metal hydroxides, carbonates, and borates, the reaction being carried out under superatmospheric pressure and at a temperature above about 150° C.

3. The method of making a hydroxy-ketone which comprises hydrolyzing a halo-ketone having the general formula, R'—CO—R—X, wherein X represents a halogen, R an aryl group, and R' an aryl or alkyl group, by reacting such halo-ketone with aqueous sodium hydroxide in the presence of a copper-containing catalyst, the reaction being carried out under superatmospheric pressure and at a temperature between about 150° and about 400° C.

4. The method of making a hydroxy-ketone which comprises hydrolyzing a chloro-ketone having the general formula, R'—CO—R—Cl, wherein R represents an aryl group an R' an aryl or alkyl group, by reacting such chloro-ketone with an aqueous hydrolytic base under superatmospheric pressure, at a temperature between about 150° and about 400° C., and in the presence of a copper-containing catalyst.

5. The method of making a hydroxy-ketone which comprises hydrolyzing a halogenated ketone having the general formula,

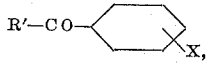

wherein X reprsents a halogen, and R' a member of the group consisting of alkyl, aryl, and haloaryl groups, by reacting such halo-ketone with an aqueous hydrolytic agent under superatmospheric pressure, at a temperature between about 150° and about 300° C., and in the presence of a copper-containing catalyst.

6. The method of making a hydroxy-ketone which comprises hydrolyzing a chloro-ketone having the general formula,

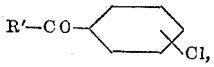

wherein R' represents an aryl or alkyl group, by reacting such chloro-ketone with an aqueous hydrolytic agent in the presence of a copper-containing catalyst, the reaction being carried out under superatmospheric pressure and at a temperature between about 150° and about 300° C.

7. The method of making a hydroxy-ketone which comprises hydrolyzing a chloro-ketone having the general formula,

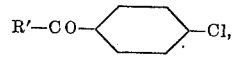

wherein R' represents an aryl or alkyl group, by reacting such chloro-ketone with an aqueous hydrolytic agent from the group consisting of sodium hydroxide, carbonate, and borate, the reaction being carried out in the presence of a copper-containing catalyst, under superatmospheric pressure, and at a temperature between about 150° and about 300° C.

8. The method of making a hydroxy-ketone which comprises hydrolyzing a chloro-ketone having the general formula, alkyl—CO—R—Cl, wherein R represents an aryl group of the benzene, naphthalene, or diphenyl series, by reacting such chloro-ketone with an aqueous hydrolytic agent under superatmospheric pressure, at a temperature between about 150° and about 300° C. and in the presence of copper.

9. The method of making a hydroxy-ketone which comprises hydrolyzing a chloro-ketone having the general formula, aryl—CO—R—Cl, wherein R represents an aryl group of the benzene, naphthalene, or diphenyl series, by reacting such chloro-ketone with an aqueous hydrolytic agent under superatmospheric pressure, at a temperature between about 150° and about 300° C. and in the presence of copper.

10. The method of making 4-hydroxy-acetophenone which comprises reacting 4-chloro-acetophenone with aqueous sodium hydroxide under superatmospheric pressure at a temperature between about 150° and about 300° C. in the presence of copper.

11. The method of making 4-hydroxy-benzophenone which comprises reacting 4-chloro-benzophenone with aqueous sodium hydroxide under superatmospheric pressure at a temperature between about 150° and about 300° C. in the presence of copper.

12. The method of making 4.4'-dihydroxy-benzophenone which comprises reacting 4.4'-dichloro-benzophenone with aqueous sodium hydroxide under superatmospheric pressure at a temperature between about 150° and about 300° C. in the presence of copper.

EDGAR C. BRITTON.